(12) United States Patent
Li

(10) Patent No.: US 11,991,408 B2
(45) Date of Patent: May 21, 2024

(54) METHOD AND APPARATUS FOR SYNCHRONOUSLY PLAYING VIDEO AMONG MULTIPLE DEVICES

(71) Applicant: BOE Technology Group Co., Ltd., Beijing (CN)

(72) Inventor: Yingjie Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/915,746

(22) PCT Filed: Aug. 12, 2021

(86) PCT No.: PCT/CN2021/112228
§ 371 (c)(1),
(2) Date: Sep. 29, 2022

(87) PCT Pub. No.: WO2022/052734
PCT Pub. Date: Mar. 17, 2022

(65) Prior Publication Data
US 2023/0130611 A1    Apr. 27, 2023

(30) Foreign Application Priority Data
Sep. 8, 2020    (CN) .......................... 202010936717.2

(51) Int. Cl.
*H04N 21/43* (2011.01)
*H04N 21/8547* (2011.01)

(52) U.S. Cl.
CPC ... *H04N 21/43076* (2020.08); *H04N 21/8547* (2013.01)

(58) Field of Classification Search
CPC ........... H04N 21/43076; H04N 21/436; H04N 21/8455; H04N 21/8547
See application file for complete search history.

(56) References Cited

U.S. PATENT DOCUMENTS
2019/0013926 A1    1/2019   Sakaue

FOREIGN PATENT DOCUMENTS
CN    101969460 A    2/2011
CN    102752642 A    10/2012
(Continued)

OTHER PUBLICATIONS
PCT/CN2021/112228 international search report and written opinion.

*Primary Examiner* — Rong Le
(74) *Attorney, Agent, or Firm* — IPro, PLLC

(57) ABSTRACT

The present disclosure provides a method and apparatus for synchronously playing video among multiple devices and belongs to the field of video playback technology. The method is performed by a master device among multiple synchronous playback devices which further include at least one slave device that is used to play a same video file as the master device. The method includes: obtaining a first start playback time point of a to-be-played key frame of the video file, in the video file; and sending, at a first moment, a synchronization instruction to the at least one slave device. The synchronization instruction includes indicating that the first start playback time point is a target synchronization time point, the first moment corresponds to a first playback progress time point in the video file, and the first playback progress time point is located before the first start playback time point. The technical solution of the present disclosure can realize synchronous video playback among multiple devices, with low implementation cost and high synchronization accuracy.

14 Claims, 5 Drawing Sheets

(56) References Cited

FOREIGN PATENT DOCUMENTS

| CN | 107360475 A | * 11/2017 | ......... H04N 21/4305 |
|---|---|---|---|
| CN | 107360475 A | 11/2017 | |
| CN | 108184158 A | 6/2018 | |
| CN | 109218795 A | 1/2019 | |

* cited by examiner

METHOD AND APPARATUS FOR SYNCHRONOUSLY PLAYING VIDEO AMONG MULTIPLE DEVICES

CROSS-REFERENCE TO RELATED APPLICATION

The present application is the U.S. national phase of PCT Application No. PCT/CN2021/112228 filed on Aug. 12, 2021, which claims a priority to the Chinese patent application No. 202010936717.2 filed in China on Sep. 8, 2020, the entire disclosure of which is incorporated herein by reference.

TECHNICAL FIELD

The present disclosure relates to the field of video playback technology, and in particular, to a method and apparatus for synchronously playing video among multiple devices.

BACKGROUND

In exhibition halls, demonstration halls and other places, multiple devices are often used to play the same media file synchronously for advertising, education and publicity. Sometimes multiple screens are required to display a certain part of the video separately to achieve a splicing effect, and sometimes multiple screens are required to play the same content to achieve a grander effect. In both cases, accurate video synchronization among multiple devices is required. Otherwise, even if there is a difference of one frame, the human eyes can see that pictures are out of synchronization, which reduces the user experience.

SUMMARY

A technical problem to be solved by the present disclosure is to provide a method and apparatus for synchronously playing video among multiple devices, which can realize synchronous video playback among multiple devices, with low implementation cost and high synchronization accuracy.

In order to solve the above technical problem, the embodiments of the present disclosure provide the following technical solutions.

In one aspect, a method for synchronously playing video among multiple devices is provided and performed by a master device among multiple synchronous playback devices which further include at least one slave device that is used to play a same video file as the master device. The method includes:
  obtaining a first start playback time point of a to-be-played key frame of the video file, in the video file; and
  sending, at a first moment, a synchronization instruction to the at least one slave device; wherein the synchronization instruction includes indicating that the first start playback time point is a target synchronization time point, the first moment corresponds to a first playback progress time point in the video file, and the first playback progress time point is located before the first start playback time point.

In some embodiments, an interval duration between the first playback progress time point and the first start playback time point is less than or equal to a display duration of one frame.

In some embodiments, before obtaining a first start playback time point of a to-be-played key frame of the video file, in the video file, the method further includes:
  obtaining a playback instruction for the video file; and
  starting to play the video file from a second start playback time point of the video file, and sending an initial synchronization instruction to the at least one slave device; wherein the initial synchronization instruction indicates taking the second start playback time point of the video file as a start playback time point.

In some embodiments, the obtaining a playback instruction for the video file, includes any of the following:
  receiving the playback instruction issued by a video server; and
  obtaining the playback instruction triggered by a preset timer.

In some embodiments, the sending, at a first moment, a synchronization instruction to the at least one slave device, includes:
  determining whether an interval duration between the first playback progress time point in the video file corresponding to a current moment and the first start playback time point is greater than a first preset threshold; if not, taking the current moment as the first moment, and sending the synchronization instruction to the at least one slave device, wherein the interval duration is greater than a preset time duration.

In some embodiments, the sending, at a first moment, a synchronization instruction to the at least one slave device, further includes:
  determining whether the interval duration between the first playback progress time point in the video file corresponding to the current moment and the first start playback time point is greater than the first preset threshold; if yes, setting a first timer, wherein a duration of the first timer is less than the interval duration; after the timer expires, re-determining an interval duration between the first playback progress time point in the video file corresponding to a current moment and the first start playback time point.

One embodiment of the present disclosure further provides a method for synchronously playing video among multiple devices, performed by a slave device among multiple synchronous playback devices which further include a master device that is used to play a same video file as the slave device. The method includes:
  receiving a synchronization instruction from the master device; wherein the synchronization instruction indicates that a first start playback time point is a target synchronization time point, and the first start playback time point is a start playback time point of a to-be-played key frame of the video file, in the video file; and
  playing the video file according to the first start playback time point of the key frame.

In some embodiments, before receiving a synchronization instruction from the master device, the method further includes:
  receiving an initial synchronization instruction from the master device, wherein the initial synchronization instruction indicates taking a second start playback time point of the video file as a start playback time point; and
  playing the video file from the second start playback time point of the video file.

In some embodiments, the playing the video file according to the first start playback time point of the key frame, includes:

determining whether an interval duration between a third playback progress time point in the video file corresponding to a current moment and the first start playback time point of the key frame is greater than a second preset threshold; if yes, starting to play the video file from the first start playback time point of the key frame; if not, continuing to play the video file from the third playback progress time point.

In some embodiments, the second preset threshold is 10-20 ms.

One embodiment of the present disclosure further provides an apparatus for synchronously playing video among multiple devices, applied to a master device among multiple synchronous playback devices which further include at least one slave device that is used to play a same video file as the master device. The apparatus includes:

an obtaining module configured to obtain a first start playback time point of a to-be-played key frame of the video file, in the video file; and a sending module configured to send, at a first moment, a synchronization instruction to the at least one slave device; wherein the synchronization instruction includes indicating that the first start playback time point is a target synchronization time point, the first moment corresponds to a first playback progress time point in the video file, and the first playback progress time point is located before the first start playback time point.

One embodiment of the present disclosure further provides an apparatus for synchronously playing video among multiple devices, applied to a slave device among multiple synchronous playback devices which further include a master device that is used to play a same video file as the slave device. The apparatus includes:

a receiving module configured to receive a synchronization instruction from the master device; wherein the synchronization instruction indicates that a first start playback time point is a target synchronization time point, and the first start playback time point is a start playback time point of a to-be-played key frame of the video file, in the video file; and a playback module configured to play the video file according to the first start playback time point of the key frame.

One embodiment of the present disclosure further provides an apparatus for synchronously playing video among multiple devices, including:

a processor; and a memory including instructions stored thereon;

wherein the instructions are configured to, when the instructions are executed by the processor, implement the above method.

One embodiment of the present disclosure further provides a storage medium, including instructions stored thereon. The instructions are executed by a processor to implement the above method.

DETAILED DESCRIPTION

In order to make the objects, the technical solutions and the advantages of the present disclosure more apparent, the present disclosure will be described hereinafter in a clear and complete manner in conjunction with the drawings and embodiments.

In the related art, when synchronous video playback is performed among multiple devices, a specific positioning time point will be provided, so that playback devices will find a nearest key frame near the specific positioning time point, and play from the nearest key frame. However, when an interval duration between key frames is relatively large, video frame skipping phenomenon will occur. In order to meet requirements of precise synchronization, in the related art, clock synchronization is often performed by means of hardware, i.e., through serial bus, thereby ensuring synchronization effect among multiple devices. However, as the number of devices increases, the deployment difficulty will increase, and the hardware cost will also increase. In addition, a positioning function of any playback time point may also be realized by modifying underlying codes of the playback device, but such solution has specific requirements on the software system and has poor generality.

Embodiments of the present disclosure provide a method and apparatus for synchronously playing video among multiple devices, which can realize synchronous video playback among multiple devices, with low implementation cost and high synchronization accuracy.

Figure 1:
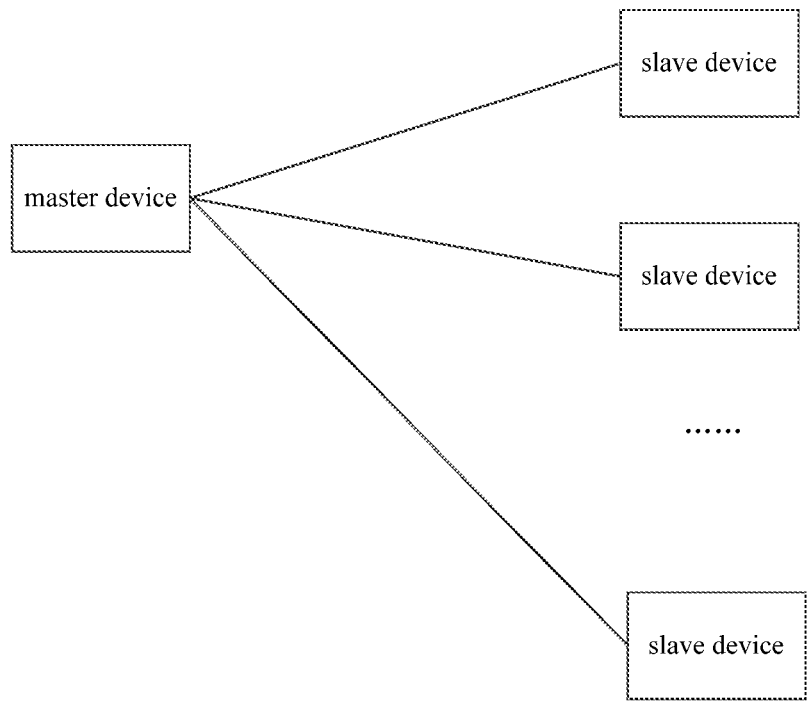
FIG. 1 is a schematic diagram showing connection between a master device and slave devices according to an embodiment of the present disclosure.

In the embodiments of the present disclosure, multiple playback devices do not need to be connected through hardware, and may be connected through wireless communication, including but not limited to local area network, Ethernet, Bluetooth, etc. Of course, data transmission between multiple playback devices may also be achieved through serial lines. As shown in FIG. 1, multiple playback devices for video synchronization include a master device and at least one slave device. The master device and the slave device are terminals with communication function, video file playback function and certain logic processing capability. The master device and the slave device may be devices with the same performance or devices with different performances. The slave device performs video synchronization based on a playback progress of the master device. The master device communicates with at least one slave device. The slave devices may not communicate with each other, or communicate with each other. One of the multiple playback devices may be designated by a server as the master device, or, one of the multiple playback devices may be pre-configured as the master device. For example, according to the playback progress or hardware information of the multiple playback devices, one of the multiple playback devices is selected as the master device. In a specific example, one playback device with the most advanced playback progress can be selected as the master device, and the rest of the playback devices are used as slave devices. In another specific example, one playback device with the most hardware resources may be selected as the master device, and the rest of the playback devices are used as slave devices. An allocation rule may also be preset, so that a master device and a slave device are automatically formed among multiple playback devices according to the allocation rule. The basis of the allocation rule is not limited.

When the master device communicates with the slave device through the wireless network, a synchronization instruction sent by the master device to the slave device may be transmitted over the wireless network; or, the server may send a to-be-played video file and a synchronization instruction to each playback device. When the master device communicates with the slave device through the local area network, data transmission delay is usually less than 1 ms, which can meet requirements of video synchronization. In order to improve communication efficiency, the communication between the master device and the slave device may use user datagram protocol (UDP) multicast mode. Of course, the communication between the master device and the slave device may also use broadcast or transmission control protocol (TCP) mode.

Figure 2:
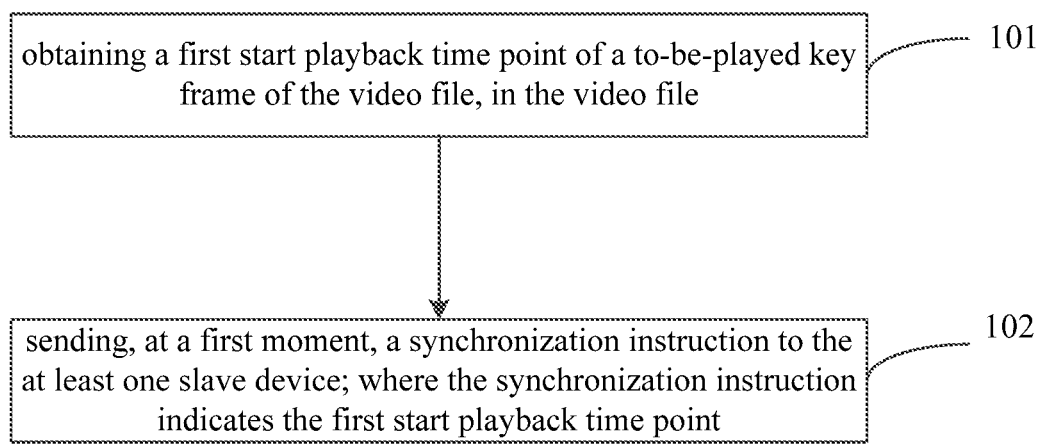
FIG. 2 is a schematic flowchart of a method for synchronously playing video among multiple devices, performed by a master device, according to an embodiment of the present disclosure.

One embodiment of the present disclosure provides a method for synchronously playing video among multiple devices, which is applied to a master device among multiple synchronous playback devices. The multiple synchronous playback devices further include at least one slave device. The master device and the slave device are used to play the same video file. As shown in FIG. 2, the method includes:

Step 101: obtaining a first start playback time point of a to-be-played key frame of the video file, in the video file;

Step 102: sending, at a first moment, a synchronization instruction to the at least one slave device; where the synchronization instruction includes indicating that the first start playback time point is a target synchronization time point, the first moment corresponds to a first playback progress time point in the video file, and the first playback progress time point is located before the first start playback time point.

The synchronization instruction instructs the slave device to take the first start playback time point as the target synchronization time point, and locate the target synchronization time point for playback.

In the embodiment of the present disclosure, before the master device plays the key frame, the master device obtains the first start playback time point of the key frame in the video file, and synchronizes, at the first moment close to playback of the key frame, the first start playback time point of the key frame to the slave device. After the slave device receives the first start playback time point of the key frame, the slave device can play the video file according to the first start playback time point of the key frame, and adjust its own playback progress, thereby realizing playback synchronization with the master device. According to this embodiment, without relying on special hardware and connection modes between the devices, accurate synchronization and smooth playback effect can be achieved at low cost, which can improve user experience. In addition, this embodiment does not involve modifying underlying decoding codes of the playback device, and thus provides better versatility.

When synchronously playing a video file, if the master device and the slave device perform communication confirmation before rendering each frame and then perform rendering to achieve video display synchronization, it is difficult to guarantee communication response delay in case that the master device corresponds to many slave devices, which will lead to problems that overall playback is not smooth and more synchronization processing resources are consumed. Therefore, according to this embodiment, it is not necessary to perform synchronization before rendering each frame, instead, synchronization is performed only before important key frames, which can save synchronization processing resources and ensure smooth playback of the playback device.

A video file generally includes I frame, P frame and B frame. In order to take into account clarity and smoothness of the video and the size of the video file, the video generally uses encoding technology, where the I frame is a complete image, and the P and B frames record contents of difference parts of the image, which can reduce data volume of the video file. In this embodiment, the I frame can be taken as a key frame, and video file synchronization is performed only before playing the I frame, which does not affect the synchronization effect on the one hand, and on the other hand, can make the playback effect smooth and improve the user experience.

In this embodiment, key frames may also be selected from video frames according to contents to be played. For example, key frames may be selected according to importance of contents of the video frames. For video frames with less important content, it is not meaningful to perform high-precision synchronization. Therefore, a video frame with more important content can be selected as a key frame, and synchronization is performed before playing the video frame with more important content; and synchronization is not required before playing other video frames.

In addition, in this embodiment, key frames may also be selected according to degree of change of picture content. If an image of one video frame does not change much from an image of a previous video frame, it is of little significance to synchronize the one video frame, and then there is no need to perform synchronization before playing the one video frame. If an image of one video frame changes greatly from an image of a previous video frame, the user's viewing experience may be affected in case that the one video frame is not synchronized; therefore, the one video frame can be selected as the key frame and then synchronization is performed before playing the one video frame.

Furthermore, when a player uses the seek method to locate a playback position, if a target positioning time point is not a time point where the key frame is located, the player will automatically locate the time point where the key frame is located, resulting in a deviation between a currently located playback position and an expected position, which results in that synchronization cannot be performed. This problem can be avoided by setting the target positioning time point to be a time point where the key frame is located.

In the embodiment of the present disclosure, before playing each key frame, it is necessary to obtain the first start playback time point of the key frame in the video file, and synchronize, at the first moment close to playback of the key frame, the first start playback time point of the key frame to the slave device. The first moment corresponds to a first playback progress time point in the video file. An interval duration between the first playback progress time point and the first start playback time point is less than or equal to a display duration of one frame, so that the slave device can perform synchronization immediately after receiving the synchronization instruction. If the first start playback time point of the key frame in the video file is sent to the slave device too early, for example, the first start playback time point of the key frame in the video file is sent to the slave device one minute or more in advance, there may be problems with the playback of the master device, such as freezing during this minute, and then the synchronization instruction will be meaningless. Even if the slave device performs synchronization according to the synchronization instruction, video playback synchronization between the slave device and the master device cannot be guaranteed. When an interval duration between the first moment and the first start playback time point of the key frame is less than or equal to a display duration of one frame, between the first moment and the first start playback time point of the key frame, the probability of problems with the playback of the master device is extremely small and can be ignored.

In some embodiments, the interval duration between the first playback progress time point and the first start playback time point is less than or equal to a display duration of one frame, so that a playback progress difference between the master device and the slave device is less than one frame, thereby ensuring the user experience.

In this embodiment, in addition to performing video synchronization before playing each key frame, video synchronization may also be performed during initial playback. In some embodiments, before obtaining a first start playback time point of a to-be-played key frame of the video file, in the video file, the method further includes:

obtaining a playback instruction for the video file;
starting to play the video file from a second start playback time point of the video file, and sending an initial synchronization instruction to the at least one slave device; where the initial synchronization instruction indicates taking the second start playback time point of the video file as a start playback time point.

In this way, when the master device starts to play the video file, the master device can send a second start playback time point "0" of the video file to the slave device. After the slave device receives the initial synchronization instruction, the slave device starts to play the video file from the beginning. In this embodiment, the video files played by the master device and the slave device may be delivered by the server to the master device and the slave device, or may be pre-stored in the master device and the slave device. For a display synchronization scene, the master device and the slave device play the same picture. For a display splicing scene, the master device and the slave device play different pictures, where the master device and the slave device may play the same video file, or the master device and the slave device can play video files obtained by re-encoding an original video file according to parts displayed by the master device and the slave device. The master device and the slave device are both used to play the same video file, and time scales played by the master device and the slave device are unified.

In some embodiments, the obtaining a playback instruction for the video file, includes any of the following:
receiving the playback instruction issued by a video server; and
obtaining the playback instruction triggered by a preset timer.

In this embodiment, the playback instruction may be obtained in real time from the server; or, the playback instruction may be pre-stored in the playback device, and the preset timer is set so that the playback instruction is triggered when the preset timer expires and then the master device starts playing the video file.

After the master device starts to play the video file, the next to-be-played key frame may be obtained by parsing the video file. For example, the next to-be-played key frame can be easily obtained through a multimedia video processing tool or an application programming interface (API) provided by the system. Then the first start playback time point of the key frame in the video file can be determined. For example, the first start playback time point of the next key frame in the video file is 0 minutes 35 seconds 40 milliseconds.

After obtaining the first start playback time point of the next key frame in the video file, the master device does not immediately send a synchronization instruction carrying the first start playback time point to the slave device. Instead, the master device first obtains a second playback progress time point in the video file corresponding to a current moment, and then calculates a difference between the second playback progress time point and the first start playback time point. If the difference is too large, the master device does not send a synchronization instruction carrying the first start playback time point to the slave device; instead, the master device will iterate in small steps, and until the first moment which approaches the first start playback time point, the master device sends a synchronization instruction carrying the first start playback time point to the slave device. Since if the first start playback time point of the key frame in the video file is sent to the slave device too early, for example, the first start playback time point of the key frame in the video file is sent to the slave device one minute or more in advance, the synchronization instruction may be meaningless in case that an actual playback speed of the master device is not accurate or the timer of the slave device is not accurate. Even if the slave device performs synchronization according to the synchronization instruction, video playback synchronization between the slave device and the master device cannot be guaranteed. Therefore, a moment for sending the synchronization instruction needs to be adjusted multiple times in a small step, so that the synchronization instruction is sent at the first moment which approaches the first start playback time point.

In some embodiments, the sending, at the first moment, the synchronization instruction to the at least one slave device, includes:
determining whether an interval duration between the first playback progress time point in the video file corresponding to a current moment and the first start playback time point is greater than a first preset threshold; if not, taking the current moment as the first moment, and sending the synchronization instruction to the at least one slave device, where a preset time duration is less than the interval duration.

In some embodiments, the sending, at the first moment, the synchronization instruction to the at least one slave device, further includes: determining whether an interval duration between the first playback progress time point in the video file corresponding to a current moment and the first start playback time point is greater than a first preset threshold; if yes, setting a first timer, where a duration of the first timer is less than the interval duration; after the timer expires, re-determining an interval duration between the first playback progress time point in the video file corresponding to a current moment and the first start playback time point.

The first preset threshold is less than a display duration of one frame. In some embodiments, the first preset threshold is 10-20 ms.

A value of the first preset threshold may be adjusted according to the time required for communication between the master device and the slave device. For example, when wireless communication is performed between the master device and the slave device through the UDP local area network, the time required for communication is generally 10 ms, and then the first preset threshold may be set to 10 ms. When the interval duration between the second playback progress time point and the first start playback time point is less than the first preset threshold, the master device directly sends a synchronization instruction to the slave device.

The duration of the first timer is the step for adjusting transmission of the synchronization instruction. The duration of the first timer is generally less than the first preset threshold. In some embodiments, the duration of the first timer is not greater than 10 ms.

Figure 3:
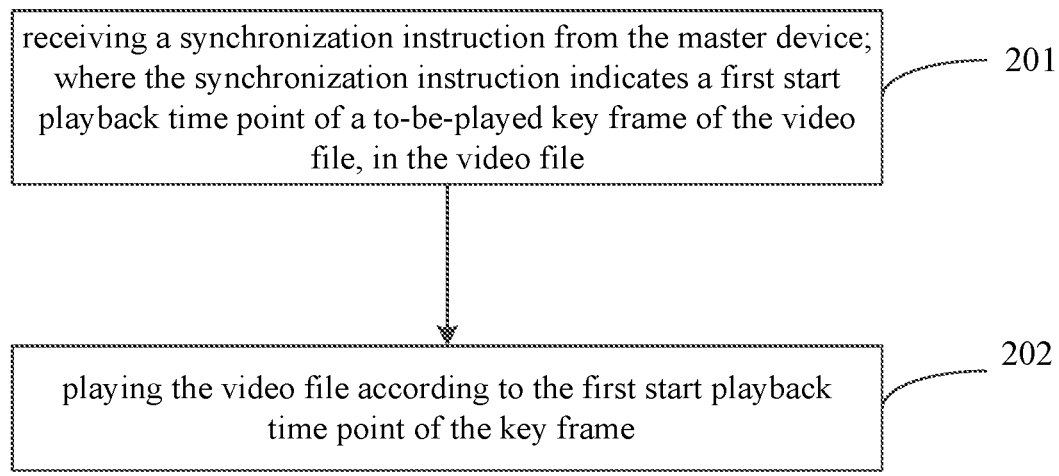
FIG. 3 is a schematic flowchart of a method for synchronously playing video among multiple devices, performed by a slave device, according to an embodiment of the present disclosure.

One embodiment of the present disclosure further provides a method for synchronously playing video among multiple devices, which is applied to a slave device among multiple synchronous playback devices. The multiple synchronous playback devices further include a master device. The master device and the slave device are used to play the same video file. As shown in FIG. 3, the method includes:

Step 201: receiving a synchronization instruction from the master device; where the synchronization instruction indicates that a first start playback time point is a target synchronization time point, and the first start playback time point is a start playback time point of a to-be-played key frame of the video file, in the video file;

Step 202: playing the video file according to the first start playback time point of the key frame.

The synchronization instruction instructs the slave device to take the first start playback time point as the target synchronization time point, and locate the target synchronization time point for playback.

In the embodiment of the present disclosure, before the master device plays the key frame, the master device obtains the first start playback time point of the key frame in the video file, and synchronizes, at the first moment close to playback of the key frame, the first start playback time point of the key frame to the slave device. After the slave device receives the first start playback time point of the key frame, the slave device can play the video file according to the first start playback time point of the key frame, and adjust its own playback progress, thereby realizing playback synchronization with the master device. According to this embodiment, without relying on special hardware and connection modes between the devices, accurate synchronization and smooth playback effect can be achieved at low cost, which can improve user experience. In addition, this embodiment does not involve modifying underlying decoding codes of the playback device, and thus provides better versatility.

In some embodiments, before receiving the synchronization instruction from the master device, the method further includes:

receiving an initial synchronization instruction from the master device, where the initial synchronization instruction indicates taking a second start playback time point of the video file as a start playback time point;

playing the video file from the second start playback time point of the video file.

When the master device starts to play the video file, the master device can send a start playback time point "0" of the video file to the slave device. After the slave device receives the initial synchronization instruction, the slave device starts to play the video file from the beginning. In this embodiment, the video files played by the master device and the slave device may be delivered by the server to the master device and the slave device, or may be pre-stored in the master device and the slave device. For a display synchronization scene, the master device and the slave device play the same picture. For a display splicing scene, the master device and the slave device play different pictures, where the master device and the slave device may play the same video file, or the master device and the slave device can play video files obtained by re-encoding an original video file according to parts displayed by the master device and the slave device. The master device and the slave device are both used to play the same video file, and time scales played by the master device and the slave device are unified.

After the slave device receives the synchronization instruction, according to an interval duration between a current playback progress of the slave device and the first start playback time point of the key frame, the slave device adjusts the playback progress. Since the naked eyes are generally unable to detect differences in a frame picture during video synchronization, if the interval duration between the current playback progress of the slave device and the first start playback time point of the key frame is less than the display time of one frame, the slave device may not adjust the playback progress and continue to play according to the current playback progress. If the interval duration between the current playback progress of the slave device and the first start playback time point of the key frame is too long, it needs to locate the first start playback time point of the key frame for playback.

In some embodiments, the playing the video file according to the first start playback time point of the key frame, includes:

determining whether an interval duration between a third playback progress time point in the video file corresponding to a current moment and the first start playback time point of the key frame is greater than a second preset threshold; if yes, starting to play the video file from the first start playback time point of the key frame; if not, continuing to play the video file from the third playback progress time point.

The second preset threshold is not greater than the display duration of one frame of picture, and may be specifically 10-20 ms.

Figure 4:
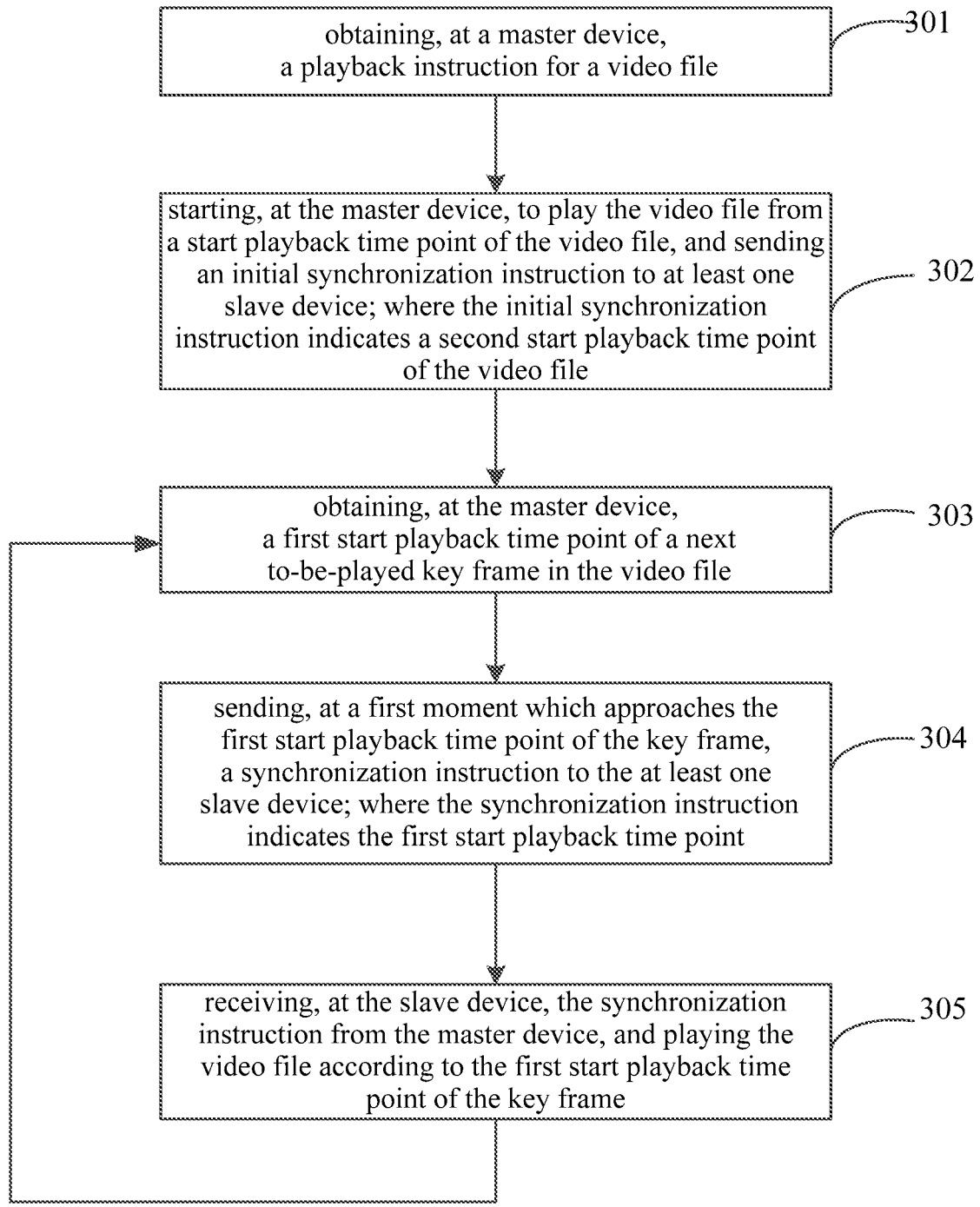
FIG. 4 is a schematic flowchart of a method for synchronously playing video among multiple devices according to an embodiment of the present disclosure.

In a specific embodiment, as shown in FIG. 4, a method for synchronously playing video among multiple devices according to an embodiment of the present disclosure includes the following steps.

Step 301: obtaining, at a master device, a playback instruction for a video file.

In this embodiment, the playback instruction may be obtained in real time from the server; or, the playback instruction may be pre-stored in the playback device, and the preset timer is set so that the playback instruction is triggered when the preset timer expires and then the master device starts playing the video file.

Step 302: starting, at the master device, to play the video file from a start playback time point of the video file, and sending an initial synchronization instruction to at least one slave device; where the initial synchronization instruction indicates a second start playback time point of the video file.

In this way, when the master device starts to play the video file, the master device can send a start playback time point "0" of the video file to the slave device. After the slave device receives the initial synchronization instruction, the slave device starts to play the video file from the beginning. In this embodiment, the video files played by the master device and the slave device may be delivered by the server to the master device and the slave device, or may be pre-stored in the master device and the slave device. For a display synchronization scene, the master device and the slave device play the same picture. For a display splicing scene, the master device and the slave device play different pictures, where the master device and the slave device may play the same video file, or the master device and the slave device can play video files obtained by re-encoding an original video file according to parts displayed by the master device and the slave device. The master device and the slave device are both used to play the same video file, and time scales played by the master device and the slave device are unified.

Step 303: obtaining, at the master device, a first start playback time point of a next to-be-played key frame in the video file.

After the master device starts to play the video file, the next to-be-played key frame may be obtained by parsing the video file. For example, the next to-be-played key frame can be easily obtained through a multimedia video processing tool or an application programming interface (API) provided by the system. Then the first start playback time point of the key frame in the video file can be determined. For example, the first start playback time point of the next key frame in the video file is 0 minutes 35 seconds 40 milliseconds.

Step 304: sending, at a first moment which approaches the first start playback time point of the key frame, a synchronization instruction to the at least one slave device; where the synchronization instruction includes indicating that the first start playback time point is a target synchronization time point.

After obtaining the first start playback time point of the next key frame in the video file, the master device does not immediately send a synchronization instruction carrying the first start playback time point to the slave device. Instead, the master device first obtains a second playback progress time point in the video file corresponding to a current moment, and then calculates a difference between the second playback progress time point and the first start playback time point. If the difference is too large, the master device does not send a synchronization instruction carrying the first start playback time point to the slave device; instead, the master device will iterate in small steps, and until the first moment which approaches the first start playback time point, the master device sends a synchronization instruction carrying the first start playback time point to the slave device. Since if the first start playback time point of the key frame in the video file is sent to the slave device too early, for example, the first start playback time point of the key frame in the video file is sent to the slave device one minute or more in advance, the synchronization instruction may be meaningless in case that an actual playback speed of the master device is not accurate or the timer of the slave device is not accurate. Even if the slave device performs synchronization according to the synchronization instruction, video playback synchronization between the slave device and the master device cannot be guaranteed. Therefore, a moment for sending the synchronization instruction needs to be adjusted multiple times in a small step, so that the synchronization instruction is sent at the first moment which approaches the first start playback time point.

Figure 5:
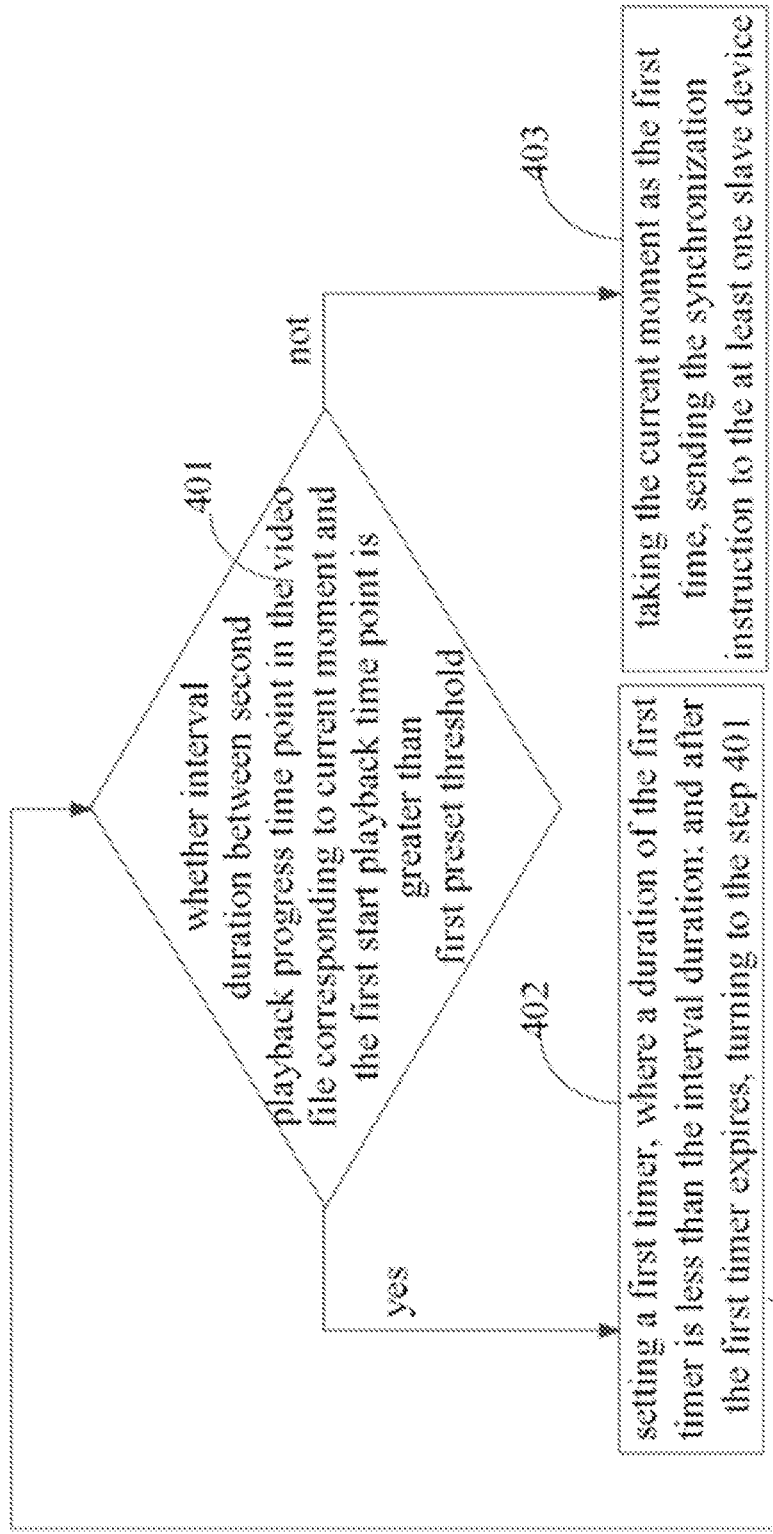
FIG. 5 is a schematic flowchart of sending, at a first moment, a synchronization instruction to a slave device according to an embodiment of the present disclosure.

As shown in FIG. 5, the sending, at the first moment, the synchronization instruction to at least one slave device, includes:

Step 401: determining whether an interval duration between a second playback progress time point in the video file corresponding to a current moment and the first start playback time point is greater than a first preset threshold; if yes, turning to step 402; if not, turning to step 403;

Step 402: setting a first timer, where a duration of the first timer is less than the interval duration; and after the first timer expires, turning to the step 401;

Step 403: taking the current moment as the first time, sending the synchronization instruction to the at least one slave device.

Step 305: receiving, at the slave device, the synchronization instruction from the master device, and playing the video file according to the first start playback time point of the key frame.

After the slave device receives the synchronization instruction, according to an interval duration between a current playback progress of the slave device and the first start playback time point of the key frame, the slave device adjusts the playback progress. Since the naked eyes are generally unable to detect differences in a frame picture during video synchronization, if the interval duration between the current playback progress of the slave device and the first start playback time point of the key frame is less than the display time of one frame, the slave device may not adjust the playback progress and continue to play according to the current playback progress. If the interval duration between the current playback progress of the slave device and the first start playback time point of the key frame is too long, it needs to locate the first start playback time point of the key frame for playback, for example, locating the video file at 0 minutes 35 seconds 40 milliseconds to start playing.

After performing the above step 305, turning to the step 303 to continue synchronization of the next key frame until synchronization of all key frames is completed.

In this embodiment, the master device may send a synchronization instruction to one slave device, or the master device may send synchronization instructions to multiple slave devices at the same time. After receiving the synchronization instruction, the slave device adjusts its own playback progress according to the synchronization instruction. In order to save communication resources, the slave device may not feed back information to the master device. When the master device sends synchronization instructions to multiple slave devices, the multiple slave devices independently adjust their own playback progress without affecting each other.

It should be noted that, the method for synchronously playing video among multiple devices according to the embodiments of the present disclosure, may be executed by an execution entity, which may be the apparatus for synchronously playing video among multiple devices, or modules for loading the method for synchronously playing video among multiple devices, in the apparatus for synchronously playing video among multiple devices. In the embodiments of the present application, the method for synchronously playing video among multiple devices according to the embodiments of the present disclosure is illustrated with an example in which the method for synchronously playing video among multiple devices is executed by the apparatus for synchronously playing video among multiple devices.

Figure 6:
FIG. 6 is a schematic diagram of an apparatus for synchronously playing video among multiple devices of a master device according to an embodiment of the present disclosure.

One embodiment of the present disclosure further provides an apparatus for synchronously playing video among multiple devices, which is applied to a master device among multiple synchronous playback devices. The multiple synchronous playback devices further include at least one slave device. The master device and the slave device are used to play the same video file. As shown in FIG. 6, the apparatus includes:

an obtaining module 11 configured to obtain a first start playback time point of a to-be-played key frame of a video file, in the video file;

a sending module 12 configured to send, at a first moment, a synchronization instruction to the at least one slave device; where the synchronization instruction includes indicating that the first start playback time point is a target synchronization time point, the first moment corresponds to a first playback progress time point in the video file, and the first playback progress time point is located before the first start playback time point.

In the embodiment of the present disclosure, before the master device plays the key frame, the master device obtains the first start playback time point of the key frame in the video file, and synchronizes, at the first moment close to playback of the key frame, the first start playback time point of the key frame to the slave device. After the slave device receives the first start playback time point of the key frame, the slave device can play the video file according to the first start playback time point of the key frame, and adjust its own playback progress, thereby realizing playback synchronization with the master device. According to this embodiment, without relying on special hardware and connection modes between the devices, accurate synchronization and smooth playback effect can be achieved at low cost, which can improve user experience. In addition, this embodiment does not involve modifying underlying decoding codes of the playback device, and thus provides better versatility.

In some embodiments, the obtaining module 11 is further configured to obtain a playback instruction for the video file.

The apparatus further includes:

a playback module configured to, start to play the video file from a second start playback time point of the video file, and send an initial synchronization instruction to the at least one slave device; where the initial synchronization instruction indicates taking the second start playback time point of the video file as a start playback time point.

In some embodiments, the obtaining module 11 is specifically configured to perform any of the following:

receiving the playback instruction issued by a video server; and obtaining the playback instruction triggered by a preset timer.

In some embodiments, the sending module 12 is specifically configured to determine whether an interval duration between the first playback progress time point in the video file corresponding to a current moment and the first start playback time point is greater than a first preset threshold; if not, taking the current moment as the first moment, and sending the synchronization instruction to the at least one slave device, where the preset time duration is less than the interval duration.

In some embodiments, the sending module 12 is specifically configured to determine whether an interval duration between the first playback progress time point in the video file corresponding to a current moment and the first start playback time point is greater than a first preset threshold; if yes, set a first timer, where a duration of the first timer is less than the interval duration; after the timer expires, re-determine an interval duration between the first playback progress time point in the video file corresponding to a current moment and the first start playback time point.

The first preset threshold is less than a display duration of one frame. In some embodiments, the first preset threshold is 10-20 ms.

The apparatus for synchronously playing video among multiple devices in this embodiment of the present disclosure may be an apparatus having an operating system. The operating system may be an Android operating system, an ios operating system, or other possible operating systems, which are not specifically limited in the embodiments of the present disclosure.

Figure 7:
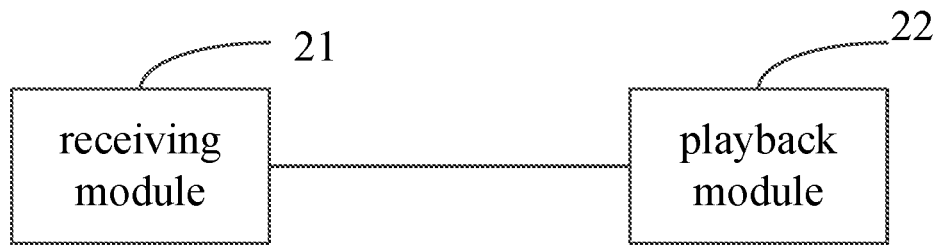
FIG. 7 is a schematic diagram of an apparatus for synchronously playing video among multiple devices of a slave device according to an embodiment of the present disclosure.

One embodiment of the present disclosure further provides an apparatus for synchronously playing video among multiple devices, which is applied to a slave device among multiple synchronous playback devices. The multiple synchronous playback devices further include a master device. The master device and the slave device are used to play the same video file. As shown in FIG. 7, the apparatus includes:

a receiving module 21 configured to receive a synchronization instruction from the master device; where the synchronization instruction indicates that a first start playback time point is a target synchronization time point, and the first start playback time point is a start playback time point of a to-be-played key frame of a video file, in the video file;

a playback module 22 configured to play the video file according to the first start playback time point of the key frame.

In the embodiment of the present disclosure, before the master device plays the key frame, the master device obtains the first start playback time point of the key frame in the video file, and synchronizes, at the first moment close to playback of the key frame, the first start playback time point of the key frame to the slave device. After the slave device receives the first start playback time point of the key frame, the slave device can play the video file according to the first start playback time point of the key frame, and adjust its own playback progress, thereby realizing playback synchronization with the master device. According to this embodiment, without relying on special hardware and connection modes between the devices, accurate synchronization and smooth playback effect can be achieved at low cost, which can improve user experience. In addition, this embodiment does not involve modifying underlying decoding codes of the playback device, and thus provides better versatility.

In some embodiments, the receiving module 21 is further configured to receive an initial synchronization instruction from the master device, where the initial synchronization instruction indicates taking a second start playback time point of the video file as a start playback time point.

The playback module 22 is further configured to start playing the video file from the second start playback time point of the video file.

In some embodiments, the playback module 22 is specifically configured to determine whether an interval duration between a third playback progress time point in the video file corresponding to the current moment and the first start playback time point of the key frame is greater than a second preset threshold; if yes, start to play the video file from the first start playback time point of the key frame; if not, continue to play the video file from the third playback progress time point.

In some embodiments, the second preset threshold is 10-20 ms.

The apparatus for synchronously playing video among multiple devices in this embodiment of the present disclosure may be an apparatus having an operating system. The operating system may be an Android operating system, an ios operating system, or other possible operating systems, which are not specifically limited in the embodiments of the present disclosure.

Figure 8:
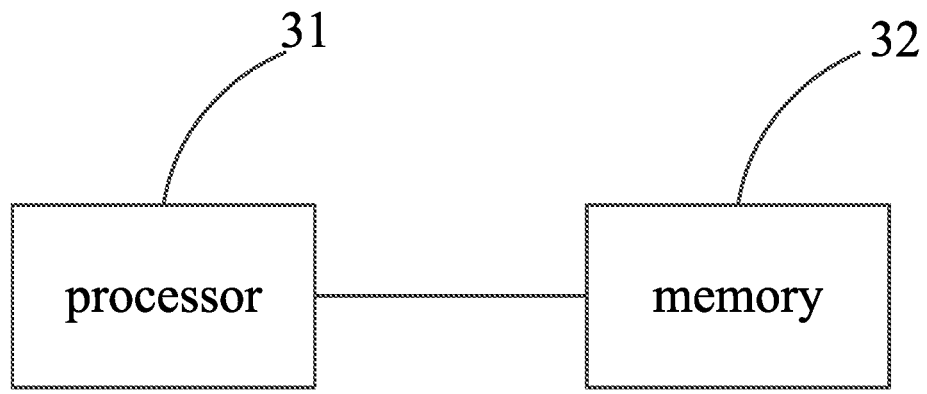
FIG. 8 is a schematic structural diagram of an apparatus for synchronously playing video among multiple devices according to an embodiment of the present disclosure.

One embodiment of the present disclosure further provides an apparatus for synchronously playing video among multiple devices, which, as shown in FIG. 8, includes:
- a processor 31;
- a memory 32 including instructions stored thereon; where the instructions are configured to, when the instructions are executed by the processor, implement the above method for synchronously playing video among multiple devices.

The processor 31 may be a processor or a collective name for multiple processing components. For example, the processor may be a CPU, ASIC, or one or more integrated circuits configured to implement the above method, such as one or more microprocessors (DSP), or one or more field programmable gate array (FPGA). The memory may be a storage component, or a collective name for multiple storage components.

The memory 32 may be a volatile memory or non-volatile memory, or may include both volatile and nonvolatile memory. The non-volatile memory may be read-only memory (ROM), programmable ROM (PROM), erasable PROM (EPROM), electrically EPROM (EEPROM) or flash memory. The volatile memory may be random access memory (RAM), which is used as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), synchlink DRAM (SLDRAM) and direct rambus RAM (DRRAM). The memory 32 described herein is intended to include, but not be limited to, these and any other suitable types of memory.

One embodiment of the present disclosure further provides a storage medium, including instructions stored thereon. When the instructions are executed by a processor, the above method for synchronously playing video among multiple devices can be implemented, which is not repeated herein.

The storage medium includes a computer-readable storage medium, such as a computer read-only memory (ROM), a random access memory (RAM), a magnetic disk or an optical disk.

It should be noted that, such words as "include" or "including" and any variations thereof are intended to cover non-exclusive inclusions. For example, a process, method, article or device that includes a series of elements, is not necessarily limited to those clearly listed elements, and may include other elements that are not clearly listed or are inherent to the process, method, article or device. Without further limitation, an element defined by the phrase "includes a . . . " does not preclude the presence of additional identical elements in a process, method, article or device that includes the element. Furthermore, it should be noted that the scope of the methods and apparatus in the embodiments of the present disclosure is not limited to performing the functions in the order shown or discussed, but may also include performing the functions in a substantially simultaneous manner or in the reverse order depending on the functions involved. For example, the described methods may be performed in an order different from a described order, and various steps may also be added, omitted, or combined. In addition, features described with reference to some examples may be combined in other examples.

From description of the above embodiments, those skilled in the art can clearly understand that the methods of the above embodiments may be implemented by means of software plus a necessary general hardware platform, and of course, may be implemented by hardware, but in many cases the former is better. On the basis of such an understanding, the technical scheme of the preset disclosure in essence or those contributing to the existing technology in embodiments of the present disclosure can be embodied in the form of software products. The computer software product may be stored in a storage medium, which may include several instructions to enable a computer device (which can be a personal computer, server, or network device, etc.) to perform all or partial of the method in each embodiment of the present disclosure.

The embodiments of the present disclosure have been described above in conjunction with the accompanying drawings, but the present disclosure is not limited to the above specific embodiments, which are merely illustrative rather than restrictive. Under the inspiration of the present disclosure, without departing from the scope of the present disclosure and the protection scope of the claims, many variations may be made, which all fall within the protection of the present disclosure.

What is claimed is:

1. A method for synchronously playing video among multiple devices, performed by a master device among multiple synchronous playback devices which further include at least one slave device that is used to play a same video file as the master device, comprising:
   obtaining a first start playback time point of a to-be-played key frame of the video file, in the video file; and
   sending, at a first moment, a synchronization instruction to the at least one slave device; wherein the synchronization instruction includes indicating that the first start playback time point is a target synchronization time point, the first moment corresponds to a first playback progress time point in the video file, and the first playback progress time point is located before the first start playback time point;
   wherein the sending, at a first moment, a synchronization instruction to the at least one slave device, includes:
   determining whether an interval duration between the first playback progress time point in the video file corresponding to a current moment and the first start playback time point is greater than a first preset threshold;
   if not, taking the current moment as the first moment, and sending the synchronization instruction to the at least one slave device, wherein the interval duration is greater than a preset time duration;
   if yes, setting a first timer, wherein a duration of the first timer is less than the interval duration; after the timer expires, re-determining an interval duration between the first playback progress time point in the video file corresponding to a current moment and the first start playback time point.

2. The method according to claim 1, wherein an interval duration between the first playback progress time point and the first start playback time point is less than or equal to a display duration of one frame.

3. The method according to claim 1, wherein before obtaining a first start playback time point of a to-be-played key frame of the video file, in the video file, the method further includes:
   obtaining a playback instruction for the video file; and starting to play the video file from a second start playback time point of the video file, and sending an initial synchronization instruction to the at least one slave device; wherein the initial synchronization instruction indicates taking the second start playback time point of the video file as a start playback time point.

4. The method according to claim 3, wherein the obtaining a playback instruction for the video file, includes any of the following:
   receiving the playback instruction issued by a video server; and
   obtaining the playback instruction triggered by a preset timer.

5. A non-transitory storage medium, comprising instructions stored thereon; wherein the instructions are executed by a processor to implement the method according to claim 1.

6. A method for synchronously playing video among multiple devices, performed by a slave device among multiple synchronous playback devices which further include a master device that is used to play a same video file as the slave device, wherein the master device is configured to obtain a first start playback time point of a to-be-played key frame of the video file, in the video file; and determine whether an interval duration between a first playback progress time point in the video file corresponding to a current moment and the first start playback time point is greater than a first preset threshold; if not, taking the current moment as a first moment, and sending a synchronization instruction to the at least one slave device, wherein the interval duration is greater than a preset time duration; wherein the synchronization instruction includes indicating that the first start playback time point is a target synchronization time point, the first moment corresponds to the first playback progress time point in the video file, and the first playback progress time point is located before the first start playback time point; if yes, setting a first timer, wherein a duration of the first timer is less than the interval duration; after the timer expires, re-determining an interval duration between the first playback progress time point in the video file corresponding to a current moment and the first start playback time point; the method for synchronously playing video among multiple devices comprises:
   receiving a synchronization instruction from the master device; wherein the synchronization instruction indicates that a first start playback time point is a target synchronization time point, and the first start playback time point is a start playback time point of a to-be-played key frame of the video file, in the video file; and
   playing the video file according to the first start playback time point of the key frame.

7. The method according to claim 6, wherein before receiving a synchronization instruction from the master device, the method further includes:
   receiving an initial synchronization instruction from the master device, wherein the initial synchronization instruction indicates taking a second start playback time point of the video file as a start playback time point; and
   playing the video file from the second start playback time point of the video file.

8. The method according to claim 6, wherein the playing the video file according to the first start playback time point of the key frame, includes:
   determining whether a duration of an interval separating a third playback progress time point in the video file, which corresponds to a current moment, and the first start playback time point of the key frame, is greater than a second preset threshold; if yes, starting to play the video file from the first start playback time point of the key frame; if not, continuing to play the video file from the third playback progress time point.

9. An apparatus for synchronously playing video among multiple devices, comprising:
   a processor; and
   a memory including instructions stored thereon;
   wherein the instructions are configured to, when the instructions are executed by the processor, implement the method according to claim 6.

10. A non-transitory storage medium, comprising instructions stored thereon; wherein the instructions are executed by a processor to implement the method according to claim 6.

11. An apparatus for synchronously playing video among multiple devices, comprising:
   a processor; and
   a memory including instructions stored thereon;
   wherein the instructions are configured to, when the instructions are executed by the processor, implement:
      obtaining a first start playback time point of a to-be-played key frame of the video file, in the video file; and
      sending, at a first moment, a synchronization instruction to at least one slave device; wherein the synchronization instruction includes indicating that the first start playback time point is a target synchronization time point, the first moment corresponds to a first playback progress time point in the video file, and the first playback progress time point is located before the first start playback time point;
   wherein when sending, at a first moment, a synchronization instruction to the at least one slave device, the instructions are configured to, when the instructions are executed by the processor, implement:
   determining whether an interval duration between the first playback progress time point in the video file corresponding to a current moment and the first start playback time point is greater than a first preset threshold; if not, taking the current moment as the first moment, and sending the synchronization instruction to the at least one slave device, wherein the interval duration is greater than a preset time duration;
   if yes, setting a first timer, wherein a duration of the first timer is less than the interval duration; after the timer expires, re-determining an interval duration between the first playback progress time point in the video file corresponding to a current moment and the first start playback time point.

12. The apparatus according to claim 11, wherein an interval duration between the first playback progress time point and the first start playback time point is less than or equal to a display duration of one frame.

13. The apparatus according to claim 11, wherein before obtaining a first start playback time point of a to-be-played key frame of the video file, in the video file, the instructions are configured to, when the instructions are executed by the processor, implement:
   obtaining a playback instruction for the video file; and
   starting to play the video file from a second start playback time point of the video file, and sending an initial synchronization instruction to the at least one slave device; wherein the initial synchronization instruction indicates taking the second start playback time point of the video file as a start playback time point.

14. The apparatus according to claim 13, wherein when obtaining a playback instruction for the video file, the instructions are configured to, when the instructions are executed by the processor, implement any of the following:
  receiving the playback instruction issued by a video server; and
  obtaining the playback instruction triggered by a preset timer.

* * * * *